June 9, 1931.  G. W. O. MARTIN  1,809,346
AREA MEASURING BY LIGHT
Filed May 23, 1928   3 Sheets-Sheet 2
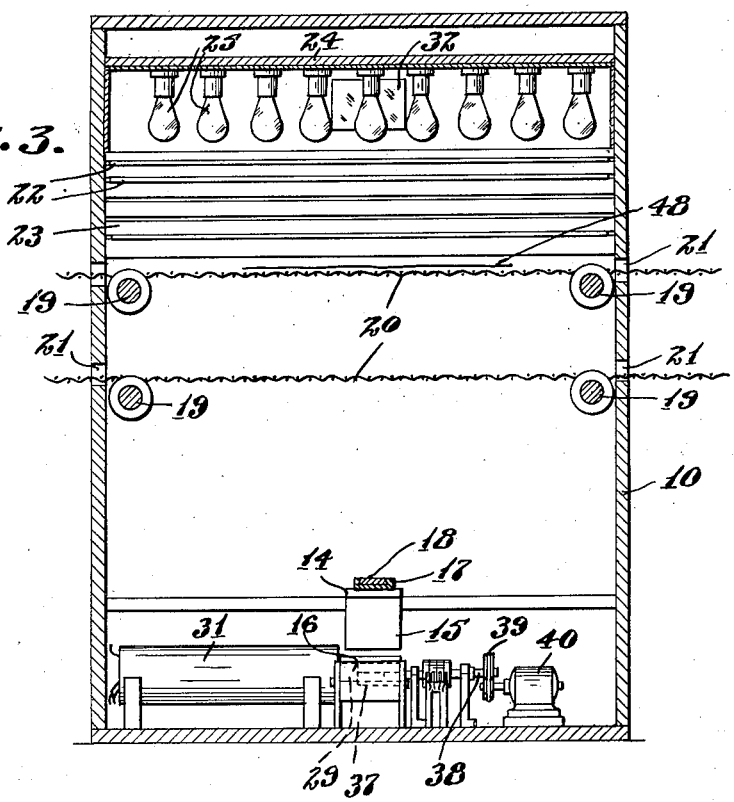
Fig. 3.
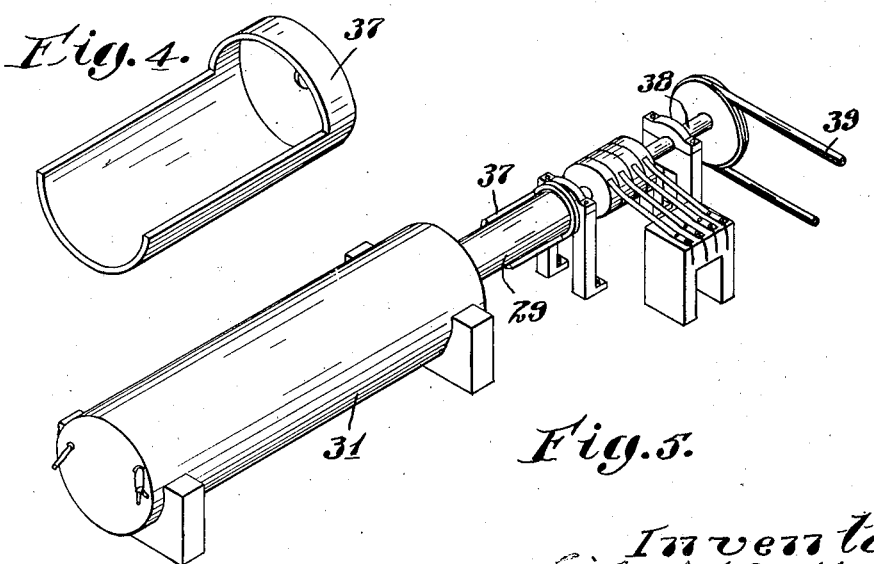
Fig. 4.
Fig. 5.
Inventor
Giles W. O. Martin
by James R. Hodder
Attorney June 9, 1931.  G. W. O. MARTIN  1,809,346
AREA MEASURING BY LIGHT
Filed May 23, 1928   3 Sheets-Sheet 3

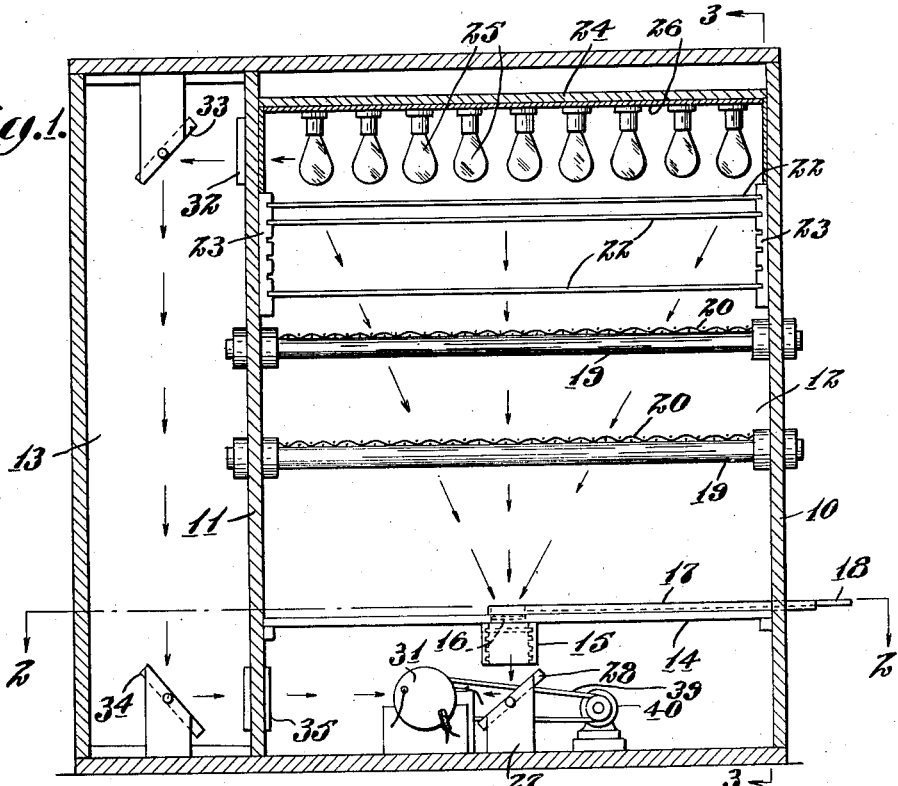
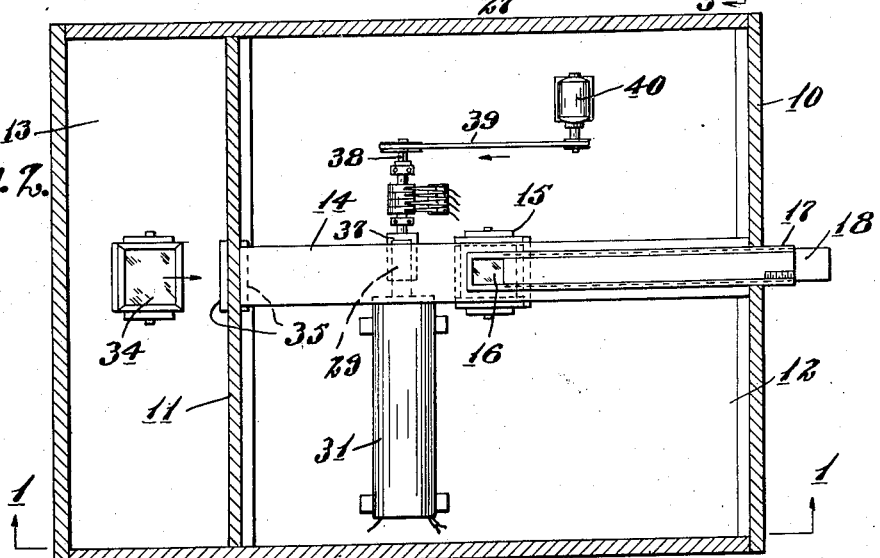

Inventor
Giles W. O. Martin
by James R. Hodder
Attorney

Patented June 9, 1931

1,809,346

UNITED STATES PATENT OFFICE

GILES W. O. MARTIN, OF NEWTON HIGHLANDS, MASSACHUSETTS, ASSIGNOR TO HARDING ENGINEERING COMPANY, OF EAST BOSTON, MASSACHUSETTS, A CORPORATION OF MASSACHUSETTS

AREA MEASURING BY LIGHT

Application filed May 23, 1928. Serial No. 280,000.

My present invention relates to measuring devices, and more particularly to an improved area measuring device for measuring the superficial area of sheet material.

In the manufacture of leather, the measurement of the area of the finished hide or skin is of great importance as the returns from the sale of such hides depends ordinarily on the area thereof. Numerous means have been devised for the purpose of accurately measuring the superficial area of hides or skins, none of which, however, are so accurate as to leave no doubt in the mind of the producer that he is not selling more area than he is getting paid for. All of such prior devices have been improved from time to time but even at the present, none of them are really accurate.

In my present invention, I have devised an improved apparatus for accurately measuring the superficial area of hides or skins or other sheet materials and have adopted an entirely new principle in my invention. I have substituted for the heretofore mechanical measuring means, a combined light and electrical device which depends for its operation on the amount of intensity of light from a given area for controlling the operation of an electrical indicating instrument, which electrical indicating instrument may be of any size or character desired and may be graduated to any degree of fineness desired, whereby the resulting measurements may be made as accurate as are considered necessary.

In carrying out my invention, I have made use of the well-known properties of the selenium cell or photo electric cell, all having its conductivity altered by varying the intensity or amount of light impinging thereon.

My preferred form of invention is illustrated in the fixed form of apparatus in which may be employed two methods of operation, called respectively, the two cell method and the flicker method. In the two cell method, I employ preferably a pair of photo electric cells having, as near as may be identical, electrical characteristics, and in which one of the cells is continually exposed to constant illumination, while the other cell is exposed to a fluctuating illumination caused by inserting between the source of light and the photo electric cell the hide or skin whose area is to be measured. This method provides a very sensitive differential method for determining when two surfaces are equally illuminated and therefore enables a close measuring of the superficial area of a hide or skin.

In the second method, known as the flicker method, a single photo electrical cell is employed which is subjected to exposure by two sources of light, the two sources of light ordinarily being equal in intensity. By means of an appropriate shutter, the light from the two sources is alternately cut off and turned on and the intensity of one of the sources of light is varied by the interposition of the hide or skin to be measured between such source and the photo electric cell. This also provides a differential scheme for accurately measuring the superficial area of a hide or skin or other sheet material.

The object of my invention, therefore, is an improved area measuring machine.

In the accompanying drawings illustrating the preferred embodiment of my invention, Fig. 1 is a sectional side elevation of my device, taken on the line 1—1 of Fig. 2;

Fig. 2 is a plan view taken on the line 2—2 of Fig. 1;

Fig. 3 is a side elevation taken on the line 3—3 of Fig. 1;

Fig. 4 is a perspective view of the rotating shutter;

Fig. 5 is a perspective view of the outer casing of the photo electric cell showing the driving mechanism for a rotating shutter associated therewith;

Figure 6:
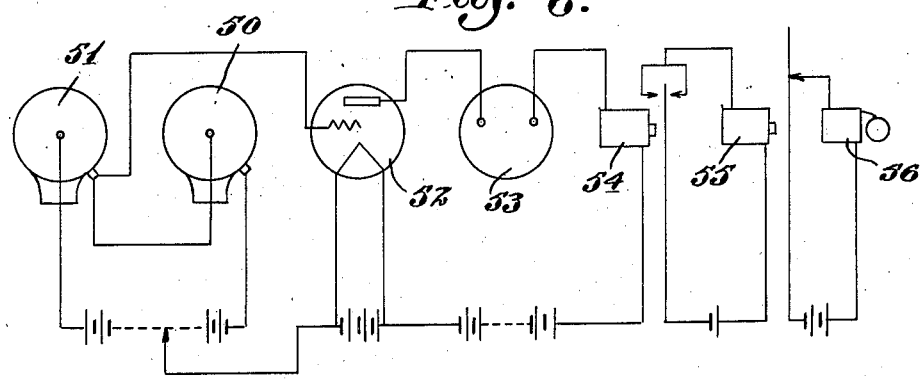
Fig. 6 is a circuit diagram of one of the methods employed.

Referring to the drawings, 10 designates a rectangular case of any suitable material, provided with a transverse partition 11 therein dividing the interior of the casing into two chambers, 12 and 13 respectively. In the chamber 12, lying parallel to the bottom of the casing is a plate 14, having attached centrally thereto and extending downwardly therefrom a lens box 15 containing a lens 16. Secured to the top of the plate 14 is a guide 17, in which works a sliding shutter 18 to control the amount of exposure of the lens 16, such shutter 18 being operable from the outside of the casing 10. At various points on the height of the casing 10 are arranged bars 19, on which may rest screens 20, the side walls of the casing 10 being perforated, as indicated at 21, to allow such screens 20 to be operated from without the casing 10. Above the screens 20 and parallel thereto, are arranged any desired number of sheets 22 of opaque or translucent material, such as glass, these sheets being adjustably contained in slotted brackets 23 secured to the walls of the casing 10. Above the uppermost sheet 22 and in the casing 10 is secured plate 24, having secured to its under face a bank of preferably incandescent lamps 25, and the number of lamps may be any desired, depending on the size of the lamps and the intensity of the light it is desired to have emanate therefrom. For safety sake, the space surrounding the lamps is lined with insulating material 26. Secured to the bottom of the casing 10 in alinement with the lens 16 in the lens box 15 is a standard or base 27 carrying at its upper face an adjustably mounted mirror or reflector 28, such mirror or reflector normally lying at an angle to the horizontal. A portion of the light emanating from the bank of lamps 25 is projected downwardly and a certain proportion thereof follows the direction of the arrows indicated in Fig. 1 for example, and passes through the lens 16 and impinges on the mirror or reflector 28, which reflects it to the left, as shown in Fig. 1, and through a perforation or orifice in a member 29 forming part of the photo electric cell, such orifice being indicated diagrammatically in Fig. 7 by the reference numeral 30, and the photo electric cell being indicated diagrammatically by the reference numeral 31 in Fig. 7. A portion of the light emanating from the bank of lamps 25 passes horizontally through a perforation 32 in the partition wall 11 and impinges on and is reflected by an adjustably mounted mirror 33 downwardly as indicated by the arrows in Fig. 1, where it impinges on and is reflected by an adjustably mounted mirror 34 located at the bottom of the casing 10 and in the direction of the arrow shown, passing through an orifice or perforation 35 in the partition wall 11, and thence passes through a perforation or orifice in the member 29, as indicated diagrammatically in Fig. 7 by the reference numeral 36.

The photo electric cell 31 is thus subjected to the light from the bank of lamps 25 directly and to the light from the bank of lamps 25 indirectly, and if the light from these sources passing through the perforations or orifices 30 and 36, are equal in intensity, there will be no effect produced in the photo electric cell 31. If, however, a sheet of leather or other sheet material is placed on one of the screens 20, it is obvious that a portion of the light emanating from the bank of lamps 25 and passing downwardly will be intercepted so that the amount of light passing through the lens 16 and entering the orifice 30 will be less than the amount of light passing from the bank of lamps 25 and following the path defined by the mirrors 33 and 34 and entering the perforation or orifice 36. Under these conditions, a certain effect will be produced in a photo electric cell 31. Surrounding the end of the member 29, is a shutter 37, which is connected to the end of a shaft 38 rotated by means of a belt 39 from any suitable source of power, as an electric motor 40. By means of the shutter 37, the light is alternately cut off and turned on at the orifices 30 and 36.

Figure 7:
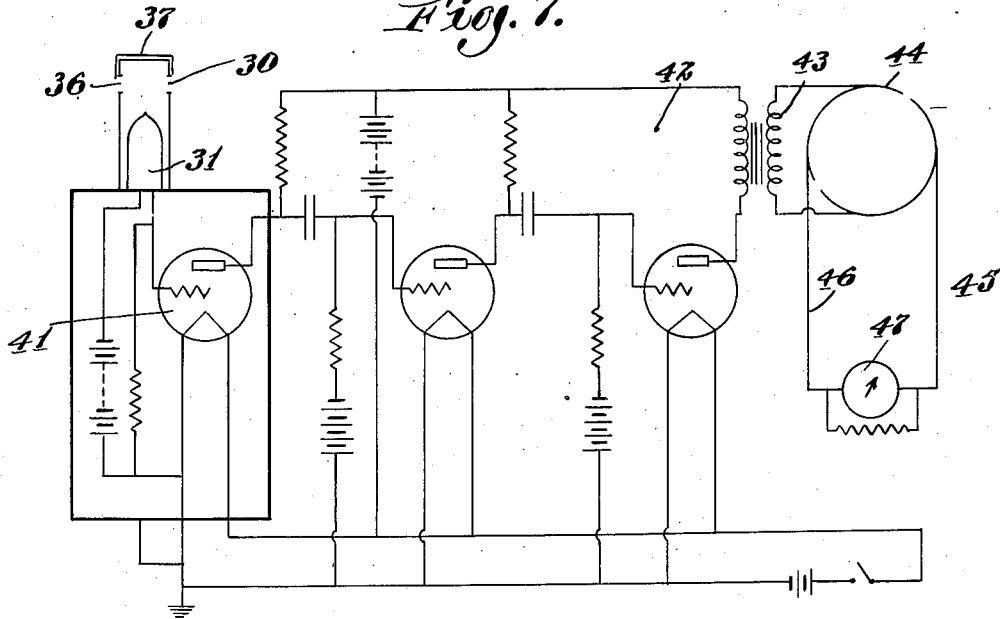
Fig. 7 is a circuit diagram of the other method employed.

Referring now to Fig. 7, which illustrates a preferred form of circuit arrangement and indicating means utilized in connection with the structures above described, there is indicated, as above pointed out, the orifices 30 and 36 and the photo electric cell 31. The photo electric cell 31 is connected to a vacuum tube 41 and the vacuum tube 41 is connected in any well known manner through the amplifying circuits indicated generally by the reference character 42. Connected to the amplifying circuit 42 is a transformer 43 where the current in the amplifying circuit 42 is changed to an alternating voltage and the secondary of this transformer 43 is connected to a commutator 44 rotated by suitable means in synchronism or in phase with the rotating shutter 37. Connected to the commutator 44 by leads 45 and 46 is an electrical indicating instrument 47 such as a galvanometer.

In operation, a source of current is turned into the bank of lamps 25 and the mirrors 33 and 34 adjusted until a beam of light from such bank of lamps 25 passes into the orifice 36. Also the shutter 18 is adjusted with respect to the lens 16, until the light reflected by the mirror 28 not only passes through the orifice 30, but is also of equal intensity to the light passing through the orifice 36. Under these conditions, therefore, no indication will appear in the indicating instrument 47. Power is turned into the motor 40 to rotate the shutter 37 and thus the light from the photo-electric cell 31 is alternately cut off at the orifices 30 and 36. As long as the intensity of the light through the two orifices is equal, no effect will be produced in the photo electric cell 31. If, however, a sheet of leather or other sheet material 48 is placed on one or the other of the screens 20, then a certain amount of light that ordinarily passes downward through the lens 16 will be blocked and on the continuous rotation of the shutter 37, a light of varying intensity will be alternately passed onto and off the photo electric cell 31. The intensity of the two sources of light—considering the two sources as being present at the orifices 30 and 36—will be unequal and the effect of this variation of intensity is to generate, by means of the photo electric cell, a varying potential on the grid of the vacuum tube 41. This potential is employed in the amplifying circuit 42 above referred to and an alternating current is produced in the plate circuit of the last stage of amplification, where such alternating current is changed to an alternating voltage in the transformer 42, from which it is fed to a commutator 44, rotated in phase with the cap or shutter 37. By means of the commutator 44 there is produced a pulsating direct current, the average value of which depends on the ratio of the intensity of the light passing through the orifices 30 and 36, and also the direction of this pulsating direct current will depend on the relative values of the intensity of the light passing through the orifices 30 and 36. The pulsating current passing through the indicating instrument 47, will, if such instrument is properly calibrated, indicate the size of the sheet of leather in any units of area. By replacing the instrument 47 with a galvanometer relay, or by placing the galvanometer relay in the circuit 45, the size of the sheet of leather may be recorded in any number of ways.

Referring now to Fig. 6, where there is shown a circuit diagram in which is employed a plurality of photo electric cells 50 and 51 respectively, the photo electric cell 50 is exposed to the light passing through the lens 16, while the photo electric cell 51 is exposed to the light reflected from the mirror 34. The illumination of the photo electric cell 50, therefore, will depend, other things being constant, on the area of the leather to be measured and placed on one or the other of the screens 20. Connected in circuit with the photo electric cells 50 and 51 is a vacuum tube 52, a milliammeter 53, a double relay 54, a single relay 55, and a bell or other indicating device 56. Assuming that the cells 50 and 51 have identical characteristics and are connected, as shown in Fig. 6, and with the photo electric cell being illuminated by the light from the bank of lamps 25 directly and the photo electric cell 51 being illuminated by the bank of lamps 25 indirectly, then if a sheet of leather or other flexible material 48 is placed on one or the other of the screens 20, the amount of light normally passing to the photo electric cell 50 is reduced. This reduction in the amount of light will increase the resistance of the photo electric cell 50 and will cause the grid of the vacuum tube 52 to become positive. The change in the condition of the vacuum tube 52 will increase the current through the milliammeter 53 and the area of the piece of leather 48 may be measured directly, assuming the milliammeter to be properly calibrated. Also, the circuit through the milliammeter 53 being increased, the contact of the double relay 54 will be held fast and current will be held through the single relay coil 55, which, in turn, will hold its armature in open position and keep the circuit for the electric bell 56 open. If the sheet of leather 48 is now withdrawn from the screen 20, the amount of light passing to the photo electric cell 50 will be increased and a point will be reached where the resistance in the cell 50 is about equal to that of the cell 51. This increase in the intensity of the light will cause the grid of the vacuum tube 52 to become negative, thereby diminishing the circuit through the milliammeter 53 and allowing the double relay 54 to let go its contact. This in turn de-energizes the relay 55 and the armature thereof will close circuit for the electric bell 56, thereby causing said bell to ring.

This method as outlined above, and as diagrammatically illustrated in Fig. 6, is an extremely sensitive differential method for determining when two surfaces are equally illuminated and, therefore, may be utilized to accurately measure the superficial area of any material by means of which the light from one of the surfaces is reduced. This method, however, has the disadvantage that the two cells 50 and 51 may not have identical characteristics.

Having thus described my invention, what I claim as new is:

An improved device for measuring the superficial area of hides or skins comprising a photo electric cell, amplifying and indicating devices associated therewith, a light, means for dividing said source of light into two beams which impinge on the photo electric cell at two separate and distinct points, means for alternately cutting off the beams of light from the photo electric cell and means associated with said photo electric cell for indicating variations in the intensity of the lights in one of said beams due to the interposition of a hide or skin therein.

In testimony whereof, I have signed my name to this specification.

GILES W. O. MARTIN.